No. 820,225. PATENTED MAY 8, 1906.
H. MAHN.
CLAMP FOR HOLDING PLATES OF GLASS ASSEMBLED.
APPLICATION FILED JULY 10, 1905.
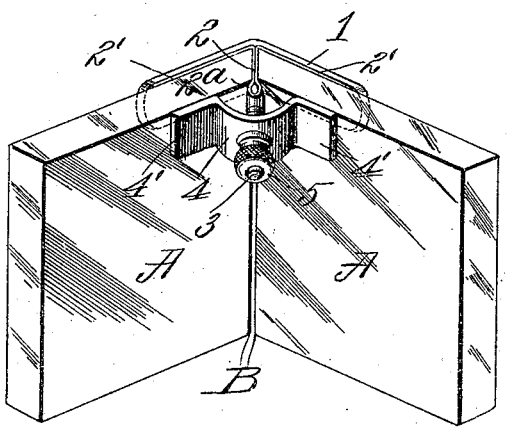
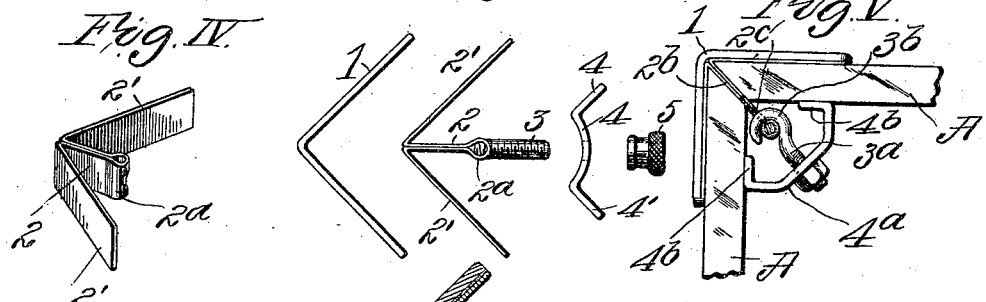
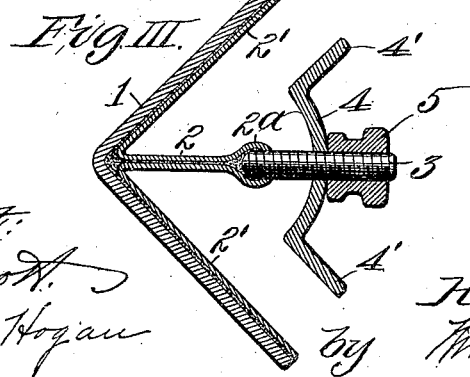
Attest:
Wm. H. Scott
Blanche Hogan
Inventor:
Hermann Mahn,
by Knight Bros.
Attys.

UNITED STATES PATENT OFFICE.

HERMANN MAHN, OF ST. LOUIS, MISSOURI.

CLAMP FOR HOLDING PLATES OF GLASS ASSEMBLED.

No. 820,225.     Specification of Letters Patent.     Patented May 8, 1906.

Application filed July 10, 1905. Serial No. 269,003.

*To all whom it may concern:*

Be it known that I, HERMANN MAHN, a citizen of the United States, residing in the city of St. Louis and State of Missouri, have invented certain new and useful Improvements in Clamps for Holding Plates of Glass Assembled, of which the following is a full, clear, and exact description, reference being had to the accompanying drawings, forming part of this specification.

My invention relates to a clamp for holding meeting edges of glass plates—such as are used in show-cases, glass store-fronts, and like objects—assembled so as to unite the plates of glass.

Figure I is a perspective view of two glass-plate sections with my clamp shown applied thereto. Fig. II is a view showing the various members of the clamp disunited and disassembled. Fig. III is an enlarged section taken through the clamp. Fig. IV is a detail perspective view of the strip or ribbon employed in carrying out my invention. Fig. V is a plan, partly in section, of a slightly-modified form of my invention.

A designates two glass-plate sections having their edges B, beveled so that they may be assembled edge to edge at an angle in the usual manner in the construction of show-cases and glass store-fronts.

1 designates the outer clamping member of my clamp, which is of V shape to provide two arms that extend in diverging directions from a junction common to both of them in order that one of the arms may extend along one side of the angle and the other arm along the other side of the angle produced by the disposal of the glass-plate sections relative to each other, as stated.

2 designates a stem that is carried by the outer clamping member 1 and which extends from the crotch of said member or, in other words, from the point of junction of the arms of the clamping member. This stem, which is located equidistant between the two arms of the outer clamping member, is formed of a single strip or ribbon of thin metal of sufficient width to give desirable rigidity to the stem, the said strip or ribbon being folded together to produce the stem and the members of the fold being brazed or soldered together to unite them. The arms 2' of the stem 2 are the continuations of the strip or ribbon from which said stem is produced, and they are of approximately the same size and configuration as the outer clamping member 1.

These stem-arms are applied to the outer clamping member at their inside faces, so as to occupy the same planes as said clamping-member arms, and the parts are united by brazing or soldering them together, as illustrated in Fig. III. By this construction the stem 2 of the clamp is very strongly secured to the outer clamping member, due to the attachment of its arms thereto, and the stem proper being integral with said arms is rendered of much greater stability than would be present therein if an end thereof were secured directly to the outer clamping member at its crotch, which is usually the practice in the production of clamps of the character to which my invention relates. The free end of the stem 2 terminates in an enlargement $2^a$, and in this enlargement is seated a screw-shank 3, that extends in line with the axis of the stem 2.

4 is an inner clamping member loosely fitted to the screw-shank 3 and opposing the outer clamping member 1. This inner clamping member is provided with arms 4', which are shaped to occupy planes corresponding to the planes of the outer clamping-member arms when the inner member is on the screw-shank 3. This provides for the arm of the inner clamping member bearing properly against the inside faces of the glass plates A when pressed thereto in opposition to the outer clamping member.

5 designates a nut applied to the screw-shank 3 and which when rotated on said shank presses against the inner clamping member and forces it inwardly toward the glass plates to be held by the clamp, whereby when the inner member is forced against the glass plates the continued rotation of the nut 5 will cause the screw-shank to be drawn through the inner clamping member and the outer clamping member to be drawn tightly to the outer sides of the glass plates and securely clamp them in assembled condition.

Any desirable number of my clamps may be used in holding plates of glass to each other in the manner described, they being properly spaced apart, and the crevices between the glass plates occurring as an incident of their separation by the clamp-stems between them may be closed in the usual manner by the use of a suitable filling.

In Fig. V of the drawings I have illustrated a slightly-modified form of the invention, wherein it will be seen that instead of seating the shank in the enlargement of the stem I have provided the screw-shank $3^a$ with a hook portion or eye $3^b$, which latter engages the stem $2^b$ by passing through a perforation $2^c$ formed therein. It will be further noticed that the inner clamping member $4^a$ is formed with inwardly-disposed arms $4^b$, which construction may be desirable in some instances. Any suitable nut, such as $5^a$, may be employed to engage the screw-shank and the inner clamping member.

I claim as my invention—

The combination of an outer clamping member, a stem consisting of a strip or ribbon of sheet metal folded intermediate of its ends and having arms cohesively secured to the arms of said outer clamping member, a screw-shank secured to said stem, an inner clamping member movably fitted to said screw-shank, and a nut on said screw-shank for imparting movement to said inner clamping member, substantially as set forth.

HERMANN MAHN.

In presence of—
 LEO G. HADLEY,
 NELLIE V. ALEXANDER.